United States Patent [19]

Benton et al.

[11] Patent Number: 4,545,260
[45] Date of Patent: Oct. 8, 1985

[54] APPARATUS FOR MEASURING FLUID FLOW RATE IN A TWO-PHASE FLUID STREAM

[75] Inventors: Thomas K. Benton; James R. Seay, both of Birmingham, Ala.

[73] Assignee: Combustion Engineering, Inc., Windsor, Conn.

[21] Appl. No.: 622,511

[22] Filed: Jun. 20, 1984

[51] Int. Cl.$^4$ .............................................. G01F 1/46
[52] U.S. Cl. ................................................. 73/861.65
[58] Field of Search .......... 73/861.65, 861.66, 861.67, 73/861.68

[56] References Cited

U.S. PATENT DOCUMENTS 4,170,134 10/1979 Nathan .............................. 73/861.65

Primary Examiner—Herbert Goldstein
Attorney, Agent, or Firm—William W. Habelt

[57] ABSTRACT

A pitot tube type apparatus (10) is specifically adapted for measuring fluid flow rate in a gas flow containing entrained liquid droplets. The probe (20) includes first and second probe means (22,24) which are interconnected through pressure transmitting lines (12,14) to a pressure differential indicator (16). The first probe means (22) has a total pressure sampling port (21) opening directly upstream into the gas flow. The second probe means (24) has a static pressure sampling port (25) opening normal to the gas flow at a location downstream of the total pressure sampling port (21). A flat plate (30) is mounted to the first probe means and extends therealong in the plane of the static pressure sampling port (25) to a point adjacent and downstream of the static pressure sampling port so as to cause the boundary layer to be established over the static pressure sampling port (25). The ports (21,25) are also sized to be substantially greater than the size of the liquid droplets entrained in the gas. A flow of blow-back gas is intermittently passed through the transmitting lines to clear the lines and the probe means of any accumulating liquid.

5 Claims, 5 Drawing Figures

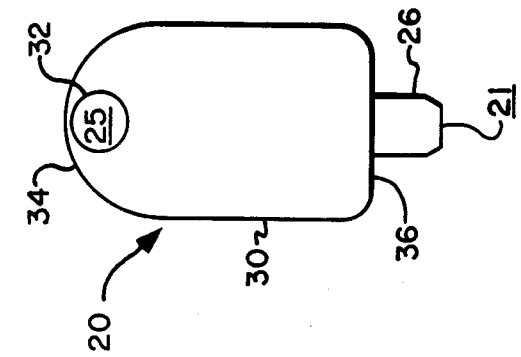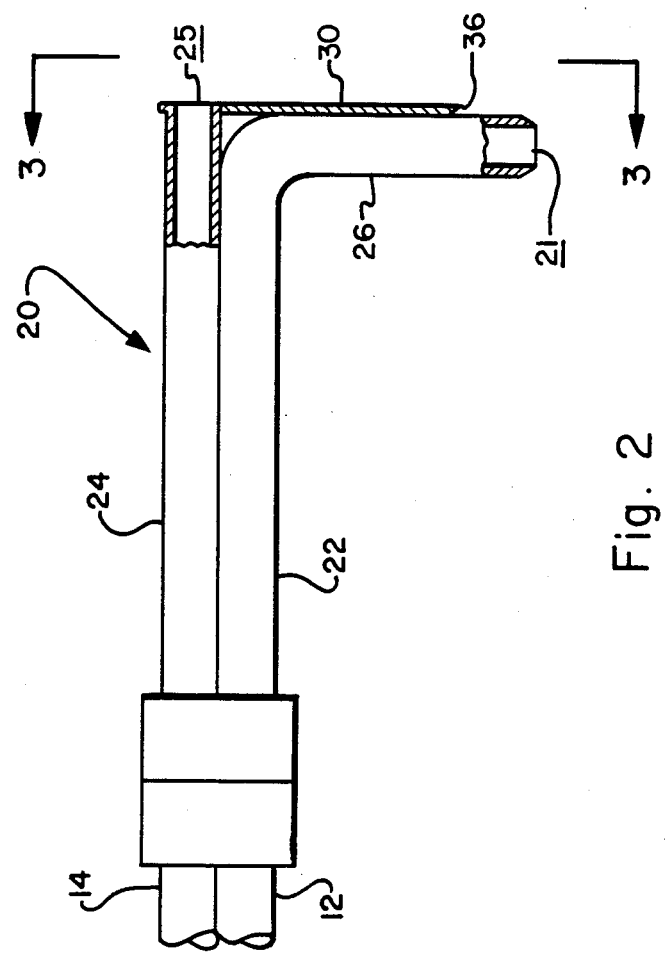

APPARATUS FOR MEASURING FLUID FLOW RATE IN A TWO-PHASE FLUID STREAM

BACKGROUND OF THE INVENTION

The present invention relates to an apparatus for measuring fluid flow rate in a two-phase flow stream and, more particularly, to a pitot tube type flow rate measuring apparatus uniquely designed to measure flow rate in a flow of a gas containing liquid droplets.

In installations such as the spray towers of wet gas scrubbers, the gas flow in and downstream of the spray tower is heavily laden with liquid droplets entrained in the gas flow. It is often desirable to measure the flow rate of this two-phase fluid through the spray tower and gas flow passages downstream thereof. In order to do so, a flow meter must be utilized which can operate in this wet gas environment without interference from the liquid droplets in the gas.

The most typical prior art pitot tube type flow meters comprise a concentric tube device wherein the interior tube is open at its end and orientated so that the end opening faces directly into the gas flow stream to measure total pressure, while a series of smaller openings, i.e. holes, are drilled about the circumference of the outer tube at a location downstream of the total pressure opening to the inner tube. The smaller openings measure static pressure and are open to the annular space between the inner and outer tubes. Although such a pitot tube design is completely satisfactory for use in a dry gas flow, the smaller static pressure holes tend to become blinded, i.e. clogged, by water droplets when such a pitot tube design is utilized in a wet gas environment. Accordingly, such pitot tubes has proven unsatisfactory for use in measuring flow rate in and downstream of the spray towers in gas scrubbers.

Another type of prior art pitot tube utilized for measuring gas flow rates is commonly referred to as the stauscheibe pitot tube. This type of pitot tube typically consists of two laterally adjacent tubes, one of which has a opening facing directly upstream into the gas flow to sense total pressure while the other tube has an opening facing directly downstream with respect to gas flow to sense the static pressure. A problem associated with using this type of tube in a wet environment such as that of a spray tower is that the gas flow through a spray tower is generally vertically upward. As a result, liquid droplets tend to deposit under the influence of gravity on the downstream static pressure opening which, in the case of a vertical upward flow, as typical in the spray tower, is facing upward.

Accordingly, it is the principle object of the present invention to provide a pitot tube type apparatus for measuring flow rate in a wet gas stream wherein the potential for blinding of the static pressure opening of the apparatus is minimized.

SUMMARY OF THE INVENTION

The present invention provides a pitot tube type apparatus for measuring fluid flow rate in a two-phase stream of fluid flowing through a flow passage which is uniquely designed so as to preclude liquid droplets entrained in the gas flow from interfering with the pressure sampling process. The apparatus of the present invention comprises first probe means insertable into the fluid stream for sensing the total pressure of the fluid stream and second probe means insertable into the fluid stream downstream of the first probe means for sensing the static pressure of the fluid flow. The first probe means has a pressure sampling port therein adapted to face directly upstream into the fluid stream upon insertion of the first probe means into the fluid stream. The second probe means has a pressure sampling port therein adapted to face normal to the direction of flow of the fluid stream through the passage upon insertion of the second probe means into the fluid stream. Pressure differential indicating means is interconnected in fluid communication with the first and second probe means for providing a representation indicative of the fluid flow rate of the fluid stream through the flow passage. Plate means are provided adjoining the first and second probe means and extending therealong in a downstream direction in the plane of the static pressure port. The leading edge of the plate means is disposed adjacent and downstream of the total pressure port of the first probe means and extends along the first and second probe means to terminate with its trailing edge disposed adjacent and downstream of the static pressure port of the second probe means. Both the total pressure port in the first probe means and the static pressure port in the second probe means are sized to be substantially greater than the size of the liquid droplets entrained in the gaseous fluid. Preferably, the leading edge of the plate is contoured so as to present a sharp paper to the fluid stream.

The pressure of the plate adjoining the first and second probe means and the sizing of the pressure sampling ports in the first and second probe means serve to preclude blinding of the pressure sampling ports by liquid droplets entrained in the gas flow. The plate means provides an obstruction around which the fluid stream will flow. As the fluid stream passes over the plate, a boundary layer will be established over the plate extending from the leading edge downstream across the surface of the plate and over the static pressure sampling port of the first probe means which opens to the gas stream through an opening in the plate mating with the static pressure sampling port.

To further ensure non-blinding of the apparatus of the present invention, it is preferred that means be provided for passing a flow of pressurized blow-back gas intermittently through the pressure transmitting lines which interconnect the pressure differential indicating means with the first and second probe means. This blow-back gas is passed at intermittent intervals back through the pressure transmitting lines and through the probe means attached thereto to blow away any liquid droplets collecting around the sampling ports and also to clear the transmitting lines and the probe means of any liquid droplets accumulating therein prior to any such accumulation interfering with the pressure sampling process.

BRIEF DESCRIPTION OF THE DRAWING

The features, advantages and objects of the present invention will be evident from the following description of the preferred embodiment thereof and the accompanying drawing wherein:

FIG. 2 is a cross-sectional, elevational view, partly in section, of the preferred embodiment of the present invention;

FIG. 3 is an end view taken along line 3—3 of FIG. 2;

DESCRIPTION OF THE PREFERRED EMBODIMENT

Figure 1:
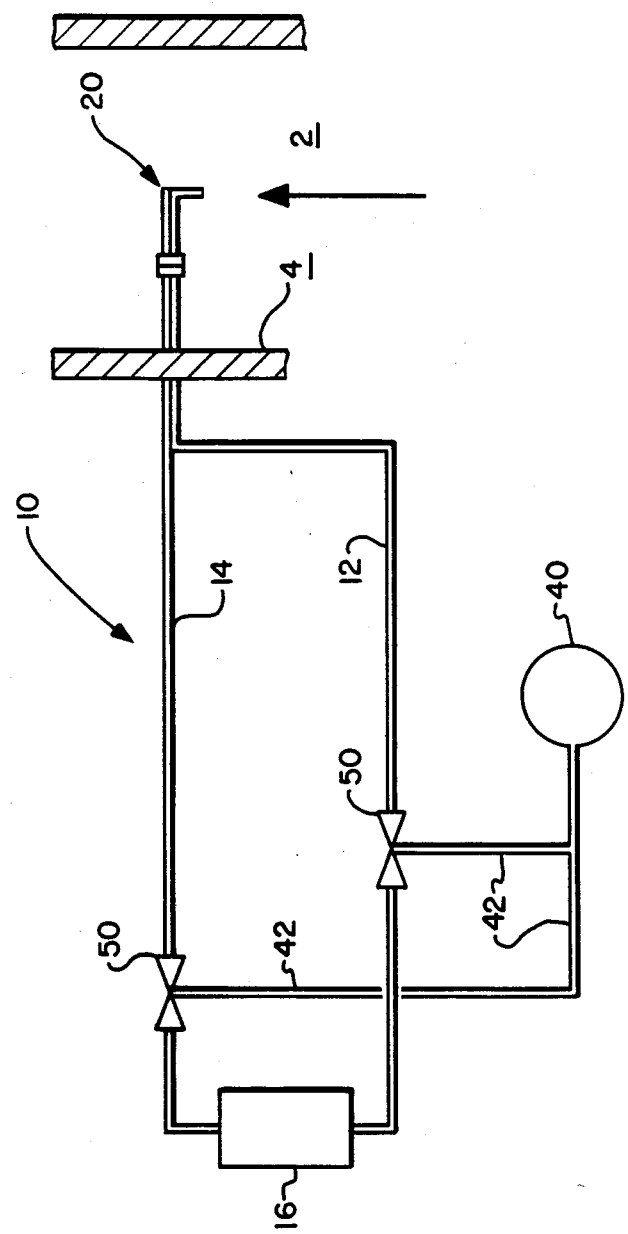
FIG. 1 is a diagrammatic view showing the apparatus of the present invention inserted into a flow passage for measuring the flow rate of a two-phase fluid stream passing therethrough.

Referring now to the drawing, and more particularly to FIGS. 1 through 3 thereof, there is depicted therein an apparatus 10 for measuring fluid flow rate in a stream of two-phase fluid flowing through a flow passage 2 defined within a housing 4. The two-phase fluid stream comprises a gaseous fluid containing liquid droplets entrained therein such as would be typically encountered in a spray tower or downstream flow ducts of a wet gas scrubber of the type commonly used to remove sulfur dioxide or other acidic compounds from fluw gases from fossil fuel furnaces or other waste gas streams.

The apparatus 10 comprises a probe head 20 insertable into the fluid stream for sensing the total pressure and the static pressure of the fluid gas stream and a pressure differential indicating means 16 which is connected by pressure transmitting lines 12 and 14. The pressure differential indicating means 16 receives a total pressure impulse from the probe head 20 through pressure transmitting line 12 and the static pressure impulse from probe head 20 through pressure transmitting line 14 and in response thereto provides a representaton indicative of the fluid flow rate of the two-phase fluid stream passing through the flow passage 2. The pressure differential indicating means 16 may be a manometer or any other type of instrument capable of providing an indication of fluid flow rate in response to receipt of the total pressure impulse and the static pressure impulse from the probe head 20.

In accordance with the present invention, the probe head 20 comprises first probe means 22 for sensing the total pressure of the fluid stream and second probe means 24 disposed downstream of the first probe means for sensing the static pressure of the fluid stream. Preferably, the first probe means 22 and the second probe means 24 are disposed adjoining each other with the second probe means 24 adjacent and immediately downstream of the first probe means 22 as shown in FIG. 2. The first probe means 22 has a pressure sampling port 21 therein adapted to face directly upstream into the fluid stream upon insertion of the probe into the fluid stream, while the second probe means has a pressure sampling port 25 therein adapted to face normal to the direction of the flow of the fluid stream upon insertion of the probe into the fluid stream. The first and second probe means 22 and 24 are connected in fluid communication with pressure transmitting lines 12 and 14, respectively, so that the total pressure impulse sampled at port 21 is transmitted through pressure transmitting line 12 to the pressure differential indicating means 16 and the static pressure impulse sampled at port 25 is transmitted through the pressure transmitting line 14 to the pressure differential indicating means 16.

In order to prevent blinding of the pressure sampling ports 21 and 25 when utilized in a wet gas environment such as that present in a spray tower of a gas scrubber, two features of the present invention are incorporated into the probe head 20. In accordance with one aspect of the present invention, the total pressure port 21 and the static pressure port 25 are sized to be substantially greater than the size of liquid droplets entrained in the gaseous fluid into which the probe head 20 is inserted. Therefore, it would take a conglomeration of liquid droplets at the sampling ports 21 and 25 in order to blind the sampling ports.

In another aspect of the present invention, a thin, substantially rectangular plate 30 is disposed adjoining the first and second probe means 22 and 24 and extending in the plane of the static pressure port 25 from a point adjacent and downstream of the total pressure port 21, along the forward extending arm of the first probe means 22 in a downstream direction to a point adjacent and downstream of the static pressure port 25 of the second probe means 24. The plate 30 has an opening 32 therein near the trailing edge 34 thereof which opens to the static pressure port 25 of the second probe means 24. Plate means 30 serves to cause a boundary layer to be established along its surface extending downstream from the leading edge 36 of the plate 30 past the opening 32 therein communicating with the static pressure sampling port 25. By establishing this boundary layer which extends over the pressure sampling port 25, liquid droplets in the fluid stream passing past the probe head 20 will remain outside the boundary layer formed along the downstream surface of the plate 30 and thereby be precluded from passing directly along the surface of the plate 30 and impact upon, and perhaps, blind the sampling port 25.

Preferably, the leading edge 36 of the plate 30 is rounded at its corners and also set back somewhat in a downstream direction from the total pressure sampling port 21 at the upstream end of the forward extending arm 26 of the first probe means 22 in order to minimize flow disturbances in the vicinity of the total pressure sampling port 21. Further, it is preferred that the leading edge 36 of the plate 30 be contoured, preferably by tapering the leading edge inwardly in a downstream direction towards the probe means 22 adjoining the plate 30, so as to present a sharp taper to the fluid stream. This sharp taper assists in establishing a stable, non-turbulent boundary layer downstream of the leading edge 36 over the surface of the plate 30.

Additionally, it is preferred that the trailing edge 34 of the plate 30 be rounded so as to define an arcuate surface at the downstream end of the plate 30 so as to minimize any distrubance of the boundary layer formed along the surface of the plate 30 in the region of the static pressure sampling port 25.

It has also been found that the plate 30 should be truncated such that the trailing edge 34 of the plate 30 is disposed adjacent immediately downstream of the static pressure sampling port 25 rather than extending any substantial distance further downstream beyond the sampling port 25. Laboratory tests of the probe head 20 with a plate 30 which did extend in a downstream direction significantly beyond the static pressure sampling port 25 revealed that a sheet of liquid was formed above the static pressure sampling port 25 which interfered with the pressure sampling process. It was found, however, that by truncating the plate 30 so that the trailing edge 34 was immediately adjacent and downstream of the static pressure sampling port 25, this phenomena of sheeting did not occur.

In the best mode presently contemplated for carrying the invention, the embodiment of the probe 20 shown in FIGS. 2 and 3 would be formed of two lengths of tubing having an outside diameter of about 0.375" and an inside diameter of about 0.277". The plate 30 would be a 20-gauge steel sheet having a thickness of about 0.036". The plate 30 would be about 1¾" wide and about 2" long and be set back approximately ⅛" from the total pressure sampling port 21 of the forward extending arm 26 of the tube 22 forming the total pressure sampling probe means.

Figure 4:
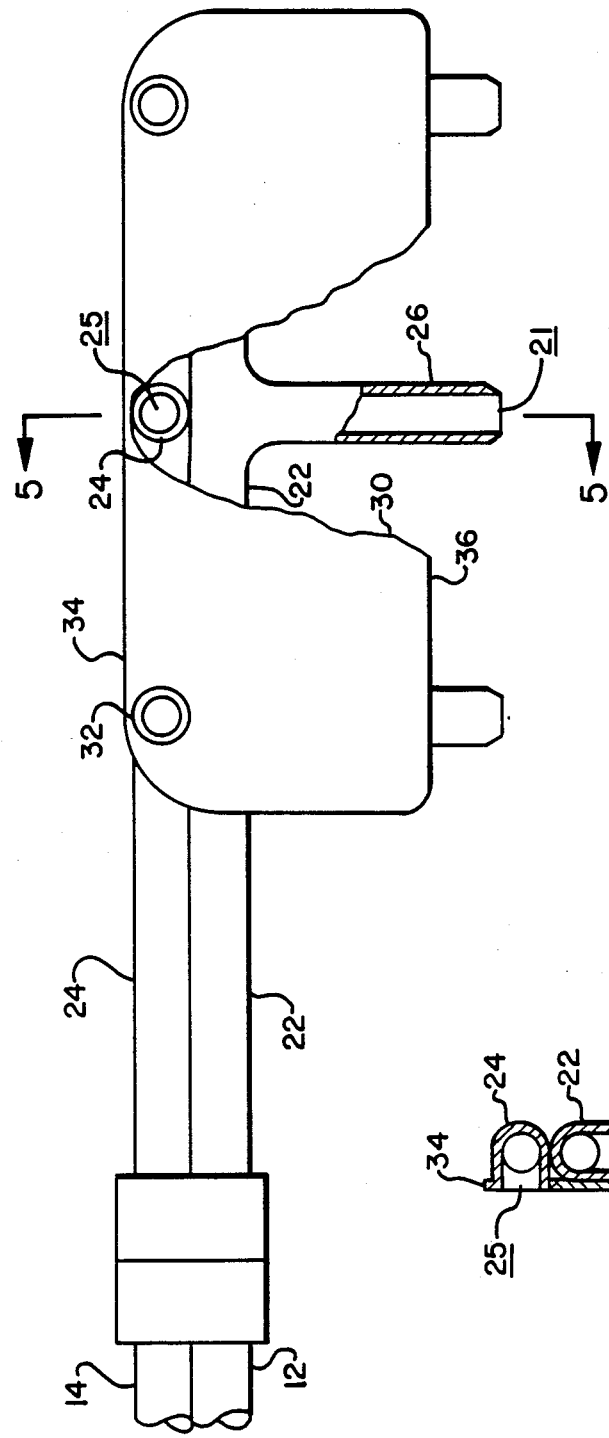
FIG. 4 is a cross-sectional plan view of an alternate embodiment of the present invention adapted for sampling at multiple points in a flow passage.
Figure 5:
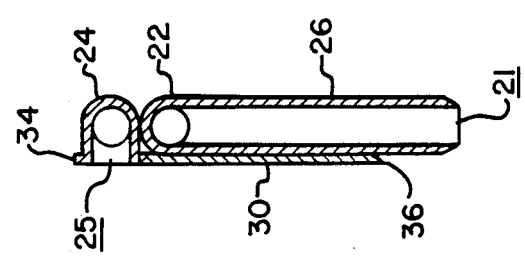
FIG. 5 is a cross-sectional view taken along line 5—5 of FIG. 4.

An alternate embodiment of the present invention is shown in FIGS. 4 and 5 wherein the probe head is adapted to sample a number of locations simultaneously across the width of the flow passage 2. This embodiment of the invention incorporates all of the features discussed above with respect to the embodiment shown in FIGS. 2 and 3. The first and second probe means 22 and 24 comprise tubes disposed adjacent to each other with the second probe means 24 immediately downstream and adjoining the first probe means 22. The first probe means 22 has a plurality of forward extending arms 26 which are directed into the fluid stream when the probe head is inserted into the fluid stream for sampling purposes. A total pressure port 21 is provided at the forward end of each of the arms 26 so as to face directly upstream into the flow of the fluid stream. An equal plurality of static pressure sampling ports 25 are provided in the second probe means 24 and are adapted to face normal to the direction of the flow of the fluid stream upon insertion of the probe head into the fluid stream. Again, a plate 30 is provided for purposes of esablishing a boundary layer to cover the static pressure ports 25. The plate 30 covers all of the static pressure sampling ports 25 and is mounted to and extends along the forward extending arms 26 of the first probe means 22 from a point adjacent and slightly downstream of the total pressure sampling ports 21 in each of the forward extending arms 26 in a downstream direction to a point adjacent and immediately downstream of the static pressure ports 25 in the second probe means 24. The plate 30 has a plurality of openings 32 each in fluid communication with one of the static pressure sampling ports 25 of the second probe means 24.

To further safeguard against blinding of the sampling ports, and particularly the static pressure sampling port 25, in a very wet gas stream, another aspect of the present invention provides for the intermittent blow-back of the pressurized gas through the pressure transmitting lines 12 and 14 to ensure that the pressure transmitting lines themselves, and the first and second probes 22 and 24, and the pressure sampling ports 21 and 25 remain free from the accumulation of liquid droplets therein. Accordingly, a three-way flow directing valve 50 is disposed in each of the pressure transmitting lines 12 and 24 intermediate the pressure differential indicating means 16 and the probe head 20. The three-way valves 50 are also interconnected in fluid communication with a supply 40 of pressurized blow-back gas, such as an air compressor or a tank of pressurized air or gas. In normal operation, the flow directing valves 50 are set so that the pressure transmitting lines 12 and 14 are opened to provide communication between the probe head 20 and the pressure differential indicating means 16. At intermittent intervals, the valves 50 are operated to close off the pressure transmitting lines 12 and 14 and to open the pressure transmitting lines 12 and 14 to the gas supply lines 42 interconnecting the valves 50 with the pressurized blow-back gas supply 40. With the valves 50 so positioned, pressurized blow-back gas travels from the supply means 40 through lines 42 into and through the pressure transmitting lines 12 and 14 and thence into the probe head 20 and through the first and second probe means 22 and 24 and thence through the pressure sampling ports 21 and 25 into the fluid stream passing through the flow passage 2. As the pressurized blow-back gas traverses the pressure transmitting lines 12 and 24 and the probe head 20, the pressurized blow-back gas will blow any liquid droplets which may have accumulated therein back into the fluid stream through the pressure sampling ports 21 and 25 and also clear the pressure sampling ports 21 and 25 of any liquid droplets which may be accumulating thereabout. In this manner, the operator of the probe can assure that blinding of the sampling ports and accumulation of liquid droplets within the transmitting lines or the probe means is precluded and that the apparatus will operate properly without interference from liquid droplets in the fluid stream.

The embodiments of the present invention shown in the drawing and described herein before are provided for illustration purposes only and it is to be understood that those skilled in the art may make modifications thereto without departing in the spirit and scope from the present invention. Accordingly, it is intended that the present invention be limited in spirit and scope only in a manner consistent with the claims appended hereto.

We claim:

1. Apparatus for measuring fluid flow rate in a stream of fluid flowing through a flow pssage wherein the fluid comprises a gaseous fluid containing liquid droplets entrained therein, said apparatus comprising:
   a. first probe means insertable into the fluid stream for sensing the total pressure thereof, said first probe means having a port therein adapted to face directly upstream into the fluid stream upon insertion of the first probe means into the fluid stream;
   b. second probe means insertable into the fluid stream downstream of said first probe means for sensing the static pressure thereof, said second probe means having a port therein adapted to face normal to the direction of flow of the fluid stream upon insertion of the second probe means into the fluid stream;
   c. pressure differential indicating means in communication with said first and second probe means for providing a representation indicative of the fluid flow rate of said fluid stream through the flow passage; and
   d. plate means adjoining said first and second probe means and extending in the plane of the static pressure port of said second probe means from a point adjacent the total pressure port of said first probe means in a downstream direction to a point adjacent and downstream of the static pressure port of said second probe means, said plate means having an opening therein in flow communication with the static pressure port of said second probe means.

2. An apparatus as recited in claim 1 further comprising:
   a. a first pressure transmitting line interconnecting the total pressure port of said first probe means in flow communication with said pressure differential indicating means;
   b. a second pressure transmitting line interconnecting the static pressure port of said second probe means in flow communication with said pressure differential indicating means; and
   c. means operatively associated with said first and second pressure transmitting lines for passing a flow of blow-back gas through said first and second pressure transmitting lines into said first and said second probe means at intermittent intervals.

3. An apparatus as recited in claim 2 wherein said means for passing a flow of blow-back gas through said first and second pressure transmitting lines comprises:
   a. means for supplying a pressurized blow-back gas; and
   b. valve means disposed in each of said first and second pressure transmitting lines intermediate said pressure differential indicating means and said first and second probe means, said valve means in fluid communication with said blow-back gas supply means and controllable so as to selectively open or close said first and second pressure transmitting lines to the flow of blow-back gas therethrough.

4. An apparatus as recited in claim 1 wherein said plate means comprises a flat plate mounted to said first probe means and having a leading edge disposed adjacent and downstream of the total pressure port of said first probe means and a trailing edge disposed adjacent and downstream of the static pressure port of said second probe means, the leading edge of said plate contoured so as to present a sharp taper to the fluid stream thereby causing a stable non-turbulent boundary layer to be formed downstream thereof over the surface of the plate.

5. An apparatus as recited in claim 1 wherein the size of the total pressure port and of the static pressure port is substantially greater than the size of the liquid droplets entrained in the gaseous fluid.

* * * * *